US008878658B2

(12) United States Patent
Hara

(10) Patent No.: US 8,878,658 B2
(45) Date of Patent: Nov. 4, 2014

(54) GEAR SHIFT NOTIFICATION APPARATUS HAVING A PRESELECTED NOTIFICATION PATTERN

(75) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 231 days.

(21) Appl. No.: 13/611,790

(22) Filed: Sep. 12, 2012

(65) Prior Publication Data
US 2014/0070930 A1    Mar. 13, 2014

(51) Int. Cl.
*G08B 21/00*    (2006.01)

(52) U.S. Cl.
USPC .......................................... 340/432; 340/456

(58) Field of Classification Search
CPC .......................... B62J 99/00; B62J 2099/0026
USPC ................. 340/432, 438, 439, 456; 74/500.5; 474/70
See application file for complete search history.

(56) References Cited

U.S. PATENT DOCUMENTS

| | | | |
|---|---|---|---|
| 4,490,127 A | 12/1984 | Matsumoto et al. | |
| 4,642,606 A | 2/1987 | Tsuyama | |
| 4,887,249 A | 12/1989 | Thinesen | |
| 5,335,188 A | 8/1994 | Brisson | |
| 5,865,454 A | 2/1999 | Campagnolo | |
| 5,970,816 A | 10/1999 | Savard | |
| 6,774,771 B2 | 8/2004 | Takeda | |
| 7,306,531 B2 | 12/2007 | Ichida et al. | |
| 7,373,232 B2 | 5/2008 | Guderzo | |
| 7,854,180 B2 | 12/2010 | Tetsuka | |
| 7,947,914 B2 | 5/2011 | Takebayashi et al. | |
| 8,137,223 B2 | 3/2012 | Watarai et al. | |
| 2004/0254650 A1 | 12/2004 | Campagnolo et al. | |
| 2008/0210043 A1 | 9/2008 | De Perini | |
| 2010/0244401 A1 | 9/2010 | Hara et al. | |

FOREIGN PATENT DOCUMENTS

| | | |
|---|---|---|
| EP | 1384659 A2 | 1/2004 |
| EP | 1526069 A2 | 4/2005 |
| EP | 1932754 A2 | 6/2008 |
| JP | 59-130741 A | 7/1984 |
| JP | 63-12839 A | 1/1988 |
| JP | 64-12924 A | 1/1989 |
| JP | 9-20153 A | 1/1997 |
| JP | 3602292 B2 | 10/2004 |

OTHER PUBLICATIONS

U.S. Appl. No. 13/545,538, filed Jul. 10, 2012.

*Primary Examiner* — Jeffery Hofsass
(74) *Attorney, Agent, or Firm* — Global IP Counselors

(57) ABSTRACT

A bicycle shift notification apparatus is provided with a transmission state determining component, a bicycle shift notification device and a controller. The transmission state determining component determines a current operating state of a bicycle transmission having a plurality of speed stages. The bicycle shift notification device produces a notification based on a determination of the current operating state by the transmission state determining component. The controller is operatively coupled to the bicycle shift notification device. The controller activates the bicycle shift notification device to produce the notification in accordance with a preselected notification pattern based on determining that a predetermined condition exists. The controller does not activate the bicycle shift notification device to produce the notification while determining that the predetermined condition does not exist.

18 Claims, 8 Drawing Sheets

|  |  |  | REAR SPROCKET CASSETTE | | | | | | | |
|---|---|---|---|---|---|---|---|---|---|---|
|  |  |  | S1 | S2 | S3 | S4 | S5 | S6 | S7 | S8 |
|  |  | TOOTH COUNT | 21 | 19 | 17 | 16 | 15 | 14 | 13 | 12 |
| FRONT CHAINWHEEL | CS1 | 39 | 1.86 →2.05 →2.29 →2.44 →2.60 →2.79 ① ② ③ ④ ⑤ ⑥ | | | | | | 3.00 | 3.25 |
| | CS2 | 52 | 2.48 | 2.74 | 3.06 →3.25 →3.47 →3.71 →4.00 →4.33 ⑦ ⑧ ⑨ ⑩ ⑪ ⑫ | | | | | | |

FIG. 5

|  |  |  | REAR SPROCKET CASSETTE | | | | | | | | |
|---|---|---|---|---|---|---|---|---|---|---|---|
|  |  |  | S1 | S2 | S3 | S4 | S5 | S6 | S7 | S8 | S9 |
|  |  | TOOTH COUNT | 34 | 30 | 26 | 23 | 20 | 17 | 15 | 13 | 11 |
| FRONT CHAINWHEEL | CS1 | 22 | 0.65 →0.73 →0.85 →0.96 ① ② ③ ④ | | | | 1.10 | 1.29 | 1.47 | 1.69 | 2.00 |
| | CS2 | 32 | 0.94 | 1.07 →1.23 →1.39 →1.60 →1.88 ⑤ ⑥ ⑦ ⑧ ⑨ | | | | | 2.13 | 2.46 | 2.91 |
| | CS3 | 44 | 1.29 | 1.47 | 1.69 | 1.91 | 2.20 →2.59 →2.93 →3.38 →4.00 ⑩ ⑪ ⑫ ⑬ ⑭ | | | | |

FIG. 6

GEAR SHIFT NOTIFICATION APPARATUS HAVING A PRESELECTED NOTIFICATION PATTERN

BACKGROUND

1. Field of the Invention

This invention generally relates to a bicycle shift notification apparatus. More specifically, the present invention relates to a bicycle shift notification apparatus that includes a bicycle shift notification device for producing a notification based on a determination of the current operating state of a bicycle transmission having a plurality of speed stages.

2. Background Information

Currently, most bicycle transmissions are manually operated by a shift operating wire connected between a manual transmission and a manually operated shift operating device mounted on the handlebar. The rider operates the shift operating device to selectively pull or release the shift operating wire which, in turn, operates a derailleur of the transmission in the desired manner. More recently, bicycles have been provided with an electric drive train for smoother and easier shifting. Electric drive trains may be operated manually or automatically. In manually operated electric drive trains, usually, a button or lever on a shift control device mounted to the bicycle handlebar is manipulated so that a gear shift command is output to operate the motor for upshifting or downshifting the bicycle transmission accordingly. In automatically operated electric drive trains, the gear shift commands are generated automatically based on various running conditions of the bicycle.

In some manual and automatic bicycle transmissions, a notification device such as a display is provided to show current gear positions. Also some bicycle transmission control systems include a sound-producing device such as a buzzer or the like for producing a sound each time the transmission is operated to change a gear position of the transmission. For example, in the case of an automatic transmission, a sound can be produced after operating the motor to change a gear position of the transmission. As a result, the rider is informed of the shifting operation only at during the actual shifting operation is being conducted. Another example of a shift notification apparatus is disclosed in U.S. Pat. No. 6,774,771 (assigned to Shimano Inc.). In this patent, every time a gear shifting operation occurs, the apparatus informs a rider of an upcoming shifting operation in a bicycle transmission based on a running condition of the bicycle.

SUMMARY

Generally, the present disclosure is directed to various features of a bicycle shift notification apparatus that only notifies a rider of an upcoming shifting operation and/or a current speed stage in a bicycle transmission upon determining that a predetermined condition exists such that the rider is not notified every time a gear shifting operation occurs. This bicycle shift notification apparatus can be used for a manual cable shift system, a manual electric shift system and an automatic shift system.

In view of the state of the known technology, a bicycle shift notification apparatus is provided that comprises a transmission state determining component, a bicycle shift notification device and a controller. The transmission state determining component determines a current operating state of a bicycle transmission having a plurality of speed stages. The bicycle shift notification device produces a notification based on a determination of the current operating state by the transmission state determining component. The controller is operatively coupled to the bicycle shift notification device. The controller activates the bicycle shift notification device to produce the notification in accordance with a preselected notification pattern based on determining that a predetermined condition exists. The controller does not activate the bicycle shift notification device to produce the notification while determining that the predetermined condition does not exist.

Other objects, features, aspects and advantages of the disclosed bicycle shift notification apparatus will become apparent to those skilled in the art from the following detailed description, which, taken in conjunction with the annexed drawings, discloses preferred embodiments of the bicycle shift notification apparatus.

BRIEF DESCRIPTION OF THE DRAWINGS

Referring now to the attached drawings which form a part of this original disclosure:

FIG. 5 is a synchro-shift gear shifting table for a bicycle shift system having two front chainwheels and eight rear sprockets;

FIG. 6 is a synchro-shift gear shifting table for a bicycle shift system having three front chainwheels and nine rear sprockets;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
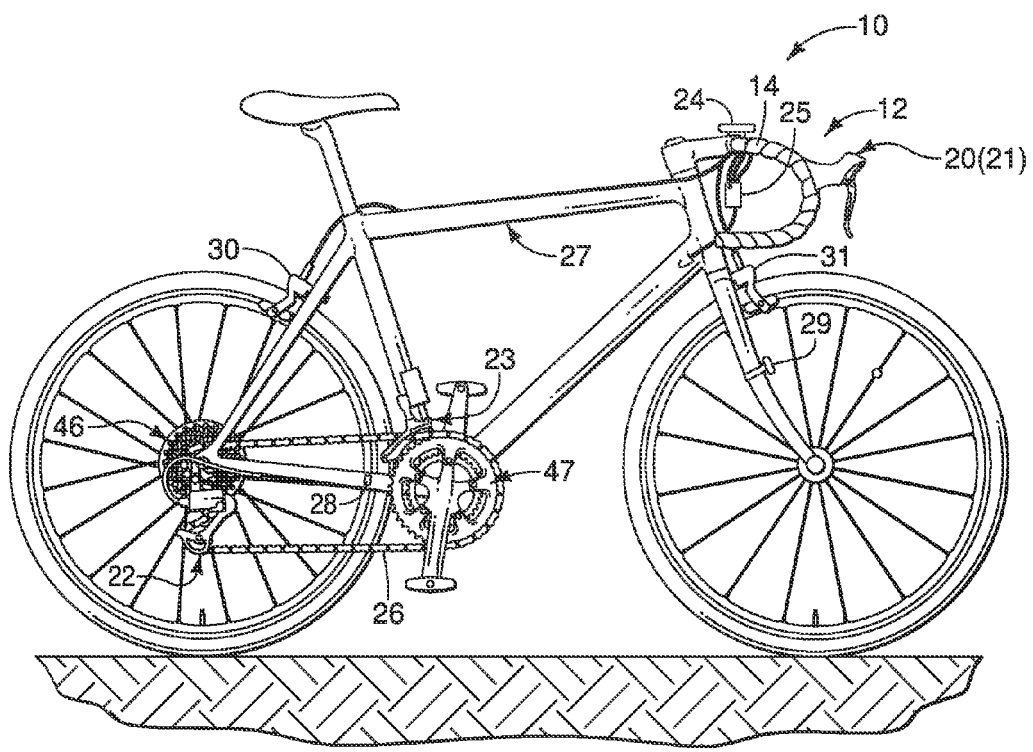
FIG. 1 is a side elevational view of a bicycle that is equipped with a bicycle shift notification apparatus in accordance with one embodiment.
Figure 2:
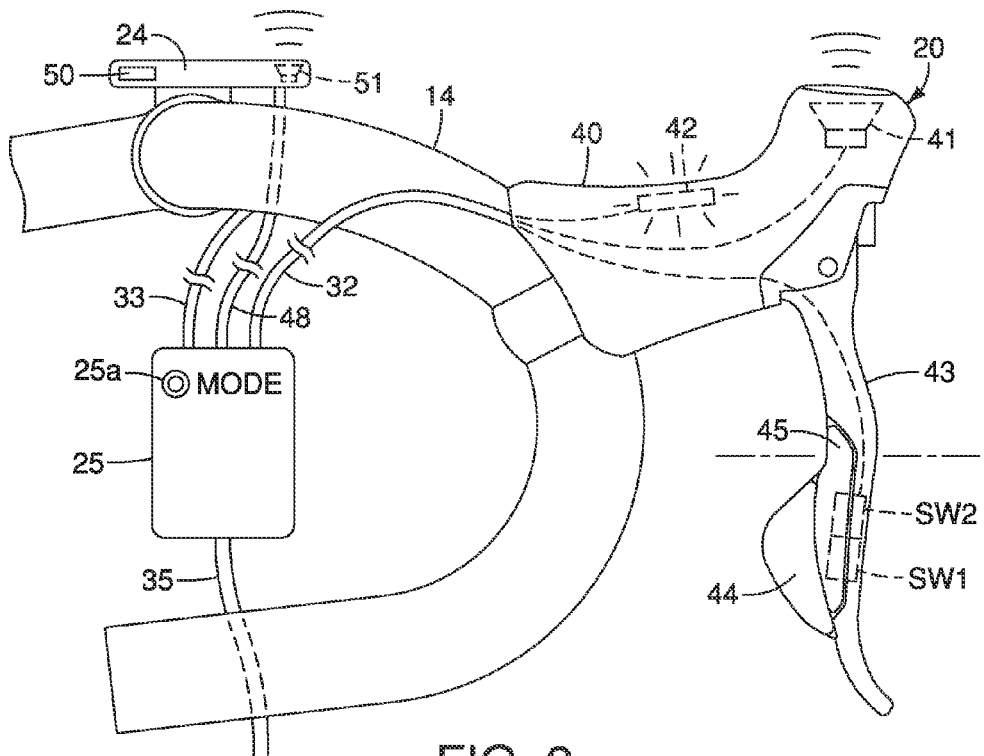
FIG. 2 is a side elevational view of the a handlebar area of the bicycle showing a road bicycle control (brake/shift) device and a cycling computer coupled a drop type handlebar of the bicycle illustrated in FIG. 1.
Figure 3:
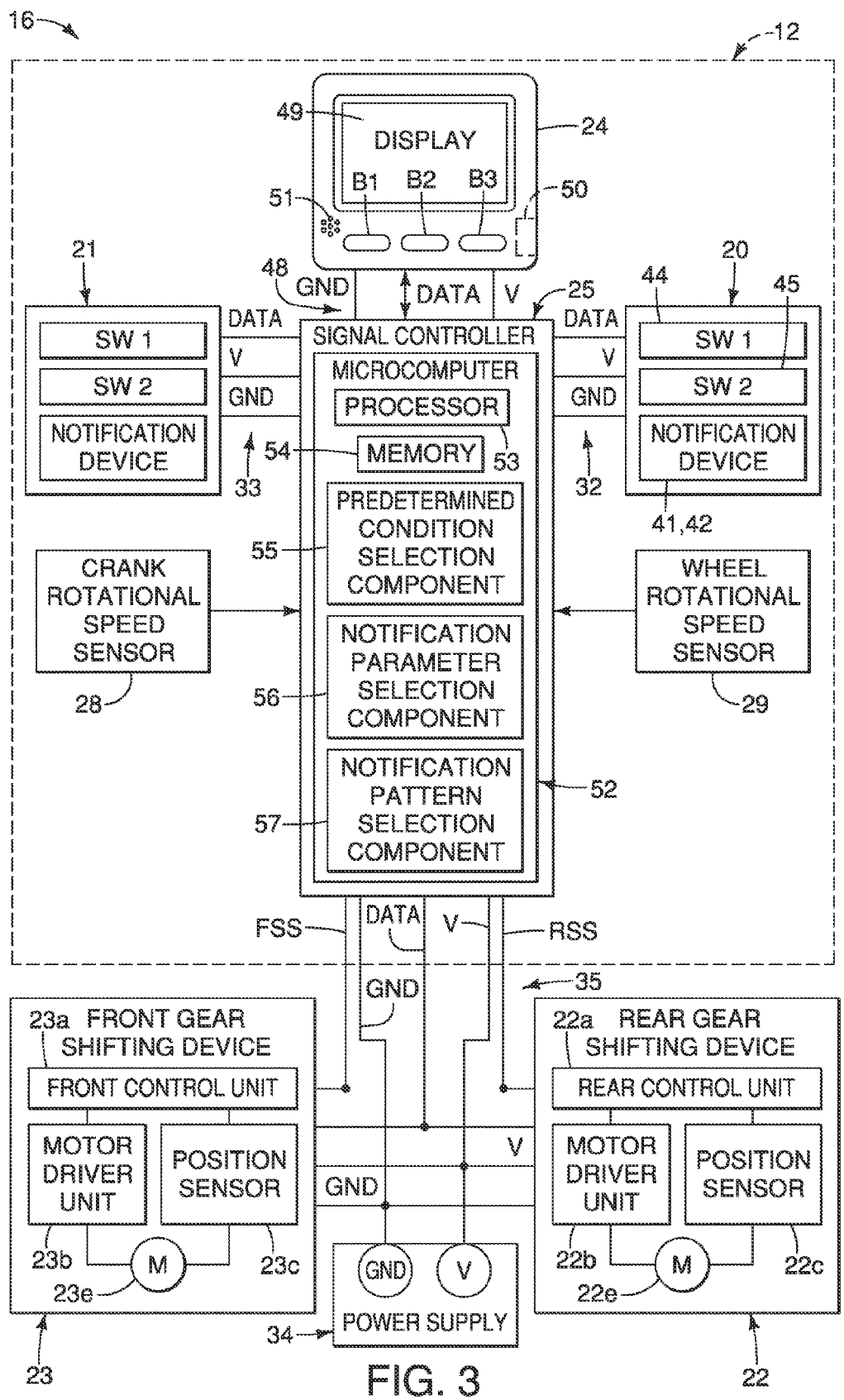
FIG. 3 is a schematic block diagram showing an overall configuration of an electric bicycle shift system including the bicycle shift notification apparatus in accordance with the embodiment illustrated in FIGS. 1 and 2.

Referring initially to FIG. 1, a bicycle 10 is illustrated that is equipped with a bicycle shift notification apparatus 12 in accordance with a first embodiment. While the bicycle 10 is illustrated as a racing style road bike, the bicycle shift notification is not limited to use with a road bike. As seen in FIG. 2, the bicycle shift notification apparatus 12 is preferably provided in the area of the handlebar 14 of the bicycle 10 for selectively notifying a rider of an upcoming shifting operation upon determining that a predetermined condition exists, as explained below. As seen in FIG. 3, the bicycle shift notification apparatus 12 is a part, of an electric bicycle shift system 16 in the illustrated embodiment. However, while the bicycle shift notification apparatus 12 is illustrated as being used in the electric bicycle shift system 14 that has both a manual shifting mode and an automatic shifting mode, it will be apparent to those skilled in the art from this disclosure that the bicycle shift notification apparatus 12 can be adapted to be used with a manual cable shift system with certain modifications.

Basically, as explained later in more detail, during riding of the bicycle 10, the bicycle shift notification apparatus 12 that only notifies a rider of an upcoming shifting operation and/or a current speed stage upon determining that a predetermined condition exists such that the rider is not notified every time a gear shifting operation occurs. This notification can be presented to the rider in a variety of ways, including, but not limited to, visually, haptically and/or auditorily. As explained later, the notification is preferably sellable by the rider and/or other user such that the type (sound, light, vibration, etc.) of the notification can be adjusted as well as the predetermined condition for triggering the notification.

Referring to FIGS. 1 and 3, the electric bicycle shift system 16 basically includes a first shift operating device or shifter 20, a second shift operating device or shifter 21, a motorized rear derailleur 22, a motorized front derailleur 23, a cycling computer 24 and a signal controller 25. In the illustrated embodiment, the signal controller 25 is provided with a mode button 25a for the rider or other users to select either the manual shifting mode or the automatic shifting mode. Alternatively, the operating mode of the electric bicycle shift system 16 can be selected in other ways such as by using the cycling computer 24 and/or operating buttons on one of the first and second shifters 20 and 21.

Figure 4:
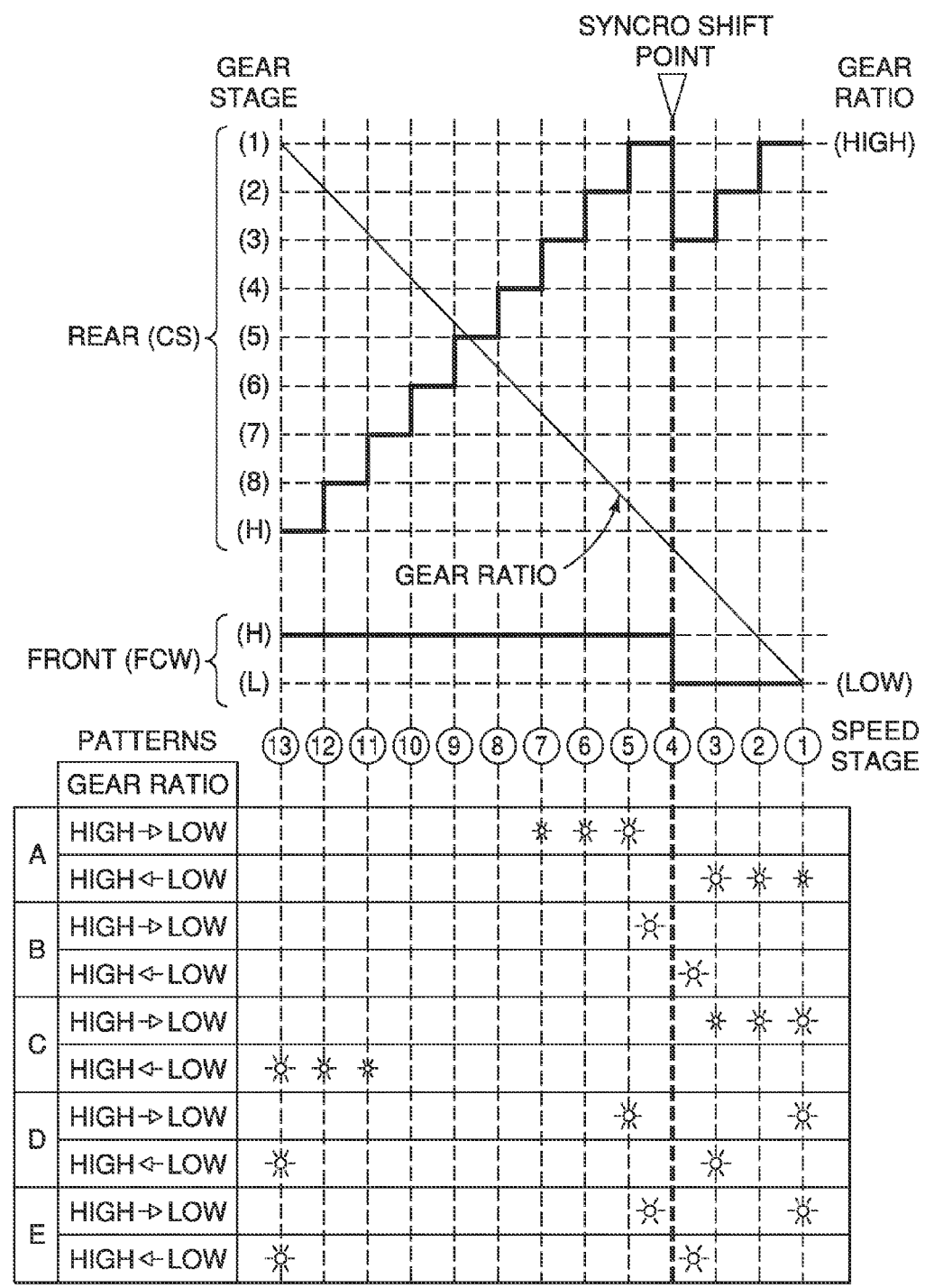
FIG. 4 is an exemplary diagram showing sounds output by the bicycle shift notification apparatus based on the gear positions of the rear and front shifting devices.

Basically, in order to shift gears in the manual shifting mode, the first and second shifters 20 and 21 are selected and operated by the rider to output control signals to operate the rear and front derailleurs 22 and 23 to move a chain 26 laterally with respect to a bicycle frame 27. In the automatic shifting mode, the signal controller 25 controls the rear and front derailleurs 22 and 23 based on one or more control signals from one or more running condition sensors. Preferably, the signal controller 25 is configured to output control signals for performing a synchro-shift during both the manual shifting mode and the automatic shifting mode. Of course, the manual shifting mode and the automatic shifting mode can also be set without the synchro-shift feature. As used herein, the term "synchro-shift" refers to a shift in which both the rear and front gear shifting devices (e.g., the rear and front derailleurs 22 and 23) are shifted nearly simultaneously to attain a target gear ratio in response to operation of a single shift operating member or a predetermined running condition occurring. As explained later, the bicycle transmission of FIG. 1 has a total of eighteen speed stages while the synchro-shift feature is not in use. However, while the synchro-shift feature is in use, the bicycle transmission of FIG. 1 has a total of only thirteen speed stages as illustrated in FIG. 4. In the example of FIG. 4, the bicycle transmission of FIG. 1 includes one synchro-shift point, which occurs at the shift between the fourth and the fifth speed stages (i.e., counting from the lowest gear ratio to the highest gear ratio). However, the bicycle transmission is not limited to a single synchro-shift point the bicycle transmission. The location and number of synchro-shift points will depend the particular gear ratios that can be attained in the particular bicycle transmission. Other words, the tooth count can be changed for the rear sprockets and the front chainwheels to change the gear ratios, which can be attained, and more or less rear sprockets and/or front chainwheels can be changed for increasing or decreasing the attainable number of speed stages. For example, FIG. 5 illustrates a shift table for a bicycle transmission with eight rear sprockets, two front chainwheels and a synchro-shift point occurring at the shift between the sixth and the seventh speed stages. FIG. 6 illustrates a shift table for a bicycle transmission with nine rear sprockets, three front chainwheels and two synchro-shift points occurring at the shift between the fourth and the fifth speed stages at the shift between the ninth and tenth speed stages. The bicycle shift notification apparatus 12 can be adapted to be used with such bicycle transmissions as disclosed in FIGS. 5 and 6.

In the illustrated embodiment, as illustrated in FIG. 3, a crank rotational speed sensor 28 and a wheel rotational speed sensor 29 are provided for providing data to the signal controller 25 for automatically controlling the shifting of the derailleurs 22 and 23. For example, based on the detection signals from the crank rotational speed sensor 28 and the wheel rotational speed sensor 29, the signal controller 25 outputs control signals to shift the derailleurs 22 and 23 to attain a target gear ratio so that the cadence is maintained at approximately 60-70 RPM, which is a comfortable value for an ordinary person cruising on a bicycle. This type of automatic shifting as well as other types of automatic shifting can be performed by the signal controller 25. Since conventional automatic shifting can be used, the details of the automatic shifting mode will not be discussed in further detail herein.

As illustrated in FIGS. 1 and 2, the first and second shifters 20 and 21 are brake and shift operating devices in which the first shifter 20 is fixedly mounted on the right-hand side of the handlebar 14 and the second shifter 22 is fixedly mounted on the left-hand side of the handlebar 14. In particular, the first shifter 20 is operatively connected to the rear derailleur 22 and a rear brake 30, while the second shifter 21 is operatively connected to the front derailleur 23 and a front brake 31. In the illustrated embodiment, the first and second shifters 20 and 21 are mechanically connected to the rear and front brakes 30 and 31, respectively, using conventional Bowden-type brake cables. In the illustrated embodiment, the first and second shifters 20 and 21 are electrically connected to the signal controller 25 by first and second electrical cables 32 and 33. Alternatively, the front derailleur 23 and the front brake 31 can be connected to the first shifter 20, and the rear derailleur 22 and the rear brake 30 can be connected to the second shifter 22.

As illustrated in FIGS. 2 and 3, the first and second electrical cables 32 and 33 output shift signals or commands to the signal controller 25 for controlling the rear and front derailleurs 22 and 23, respectively. The first and second shifters 20 and 21 also receive electrical power from a power supply or battery 34 (see FIG. 3). In particular, an electrical harness 35 is provided between the signal controller 25 and the power supply 34 such that electrical power is supplied to the signal controller 25, which in turn supplies electrical power to the first and second shifters 20 and 21 via the first and second electrical cables 32 and 33, respectively. The electrical harness 35 transmits shift signals (FSS, RSS) and position signals for the shifting devices (DATA) between the signal controller 25 and the rear and front derailleurs 22 and 23. The cables 32 and 33 and the electrical harness 35 may be replaced by a cable which includes only two conductor cables. In this case, PLC (Power Line communication) circuit boards may be included in the signal controller 25 and the rear and front derailleurs 22 and 23.

As illustrated in FIG. 2, the first shifter 20 is attached the curved portion of the handlebar 14, which is a drop-down handlebar in the illustrated embodiment. The second shifter 22 is a mirror image of the first shifter 20 and includes all of the features of the first shifter 20 discussed herein. Thus, the second shifter 22 will not be discussed in detail herein. Of course, it will be apparent from this disclosure that other types of electric shifters can be used as needed and/or desired instead of the type illustrated herein.

Basically, the first shifter 20 includes a base member 40 fixedly mounted on the right-hand side of the handlebar 14 in a conventional manner such as a band clamp as illustrated. A sound emitting device 41 and a vibration device 42 are mounted to the base member 40. The sound emitting device 41 and the vibration device 42 are examples of bicycle shift notification devices of the bicycle shift notification apparatus 12. A brake lever 43 is pivotally mounted to the base member 40 for operating the rear brake 30 in a conventional manner. The brake lever 43 has a pair of pivotally mounted shift operating members 44 and 45. The shift operating members 44 and 45 are pushed toward a center plane of the bicycle to depress electrical switches SW1 and SW2, respectively. A more detailed discussion of the shift operating members 44 and 45 and the electrical switches SW1 and SW2 can be found in U.S. Pat. No. 7,854,180 (assigned to Shimano Inc.). While the shift operating members 44 and 45 and the electrical switches SW1 and SW2 of the illustrated embodiment are constructed as shown in U.S. Pat. No. 7,854,180, the first and second shifters 20 and 21 are not limited to that particular construction. In fact, the first, and second shifters 20 and 21 can be replaced with mechanical shifters such as disclosed in U.S. Pat. No. 5,970,816, which has a manual synchro-shift system. Here, operation of the shift operating member 44 normally causes the rear derailleur 22 to perform a downshift operation such that the chain 26 moves to a larger one of the rear sprockets 46, while operation of the shift operating member 45 normally causes the rear derailleur 22 to perform an upshift operation such that the chain 26 moves to a smaller one of the rear sprockets 46. However, operation of the shift operating member 44 may cause the rear derailleur 22 to perform a downshift operation, while operation of the shift operating member 45 may cause the rear derailleur 22 to perform an upshift operation.

Referring to FIG. 3, the basic construction of the rear derailleur 22 will now be discussed. The rear derailleur 22 is basically a conventional electric derailleur that includes a rear control unit 22a (controller), a motor drive unit 22b, a position sensor 22d and a motor 22e. The rear control unit 22a, the motor drive unit 22b and a position sensor 22d form the rear actuating unit. The rear control unit 22a is configured and arranged to control the motor drive unit 22b in response to a shift control signal from operation of one of the shift switches SW1 and SW2 of the first shifter 20. The motor 22e is configured and arranged to drive a chain cage of the rear derailleur 22. The motor drive unit 22b is configured and arranged to drive the motor 22e. The position sensor 22d is configured and arranged to sense the gearshift position of the rear shifting device 22. The position sensor 22d constitutes one example of a transmission state determining component of the bicycle shift notification apparatus 12. One example of an electric rear derailleur having a position sensor (i.e., a transmission state determining component) is disclosed in U.S. Pat. No. 8,137,223 (assigned to Shimano Inc.). While a potentiometer can be used for the position sensor 22d such as disclosed in U.S. Pat. No. 8,137,223, the position sensor 22d is not limited to such a construction.

Referring back to FIG. 1, the bicycle 10 has a plurality of rear sprockets 46 for selectively receiving a drive force from the chain 26. Operation of the motor 22e of the rear derailleur 22 moves the chain 26 between the rear sprockets 46 to change rear gear stages. While the bicycle 10 is illustrated with only nine of the rear sprockets 46, the bicycle 10 can be provided with fewer or more rear sprockets 46.

Referring back to FIG. 3, the basic construction of the front derailleur 23 will now be discussed. The front derailleur 23 is basically a conventional electric derailleur that includes a front control unit 23a (controller), a motor drive unit 23b, a position sensor 23d and a motor 23e. The front control unit 23a, the motor drive unit 23b and a position sensor 23d form the front actuating unit. The front control unit 23a is configured and arranged to control the motor drive unit 23b in response to a shift control signal from operation of one of the shift switches SW1 and SW2 of the second shifter 21. The motor 23e is configured and arranged to drive a chain cage of the front derailleur 23. The motor drive unit 23b is configured and arranged to drive the motor 23e. The position sensor 23d is configured and arranged to sense the gearshift position of the front shifting device 23. The position sensor 23d constitutes one example of a transmission state determining component of the bicycle shift notification apparatus 12. One example of an electric front derailleur having a position sensor (i.e., a transmission state determining component) is disclosed in U.S. Pat. No. 7,306,531 (assigned to Shimano Inc.). While a potentiometer can be used for the position sensor 23d such as disclosed in U.S. Pat. No. 7,306,531, the position sensor 23d is not limited to such a construction.

Referring back to FIG. 1, the bicycle 10 has a pair of front chainwheels 47 for transmitting a pedaling (drive) force to the chain 26. Operation of the motor 23e of the front derailleur 23 moves the chain 26 between the front chainwheels 47 to change front gear stages. While the bicycle 10 is illustrated with only two of the front chainwheels 47, the bicycle 10 can be provided with more than two chainwheels.

The cycling computer 24 includes a microprocessor, memory and other conventional structures of a conventional cycling computer. Since cycling computers are conventional devices that are well known, the cycling computer 24 will not be discussed and/or illustrated herein, except as modified to accommodate the bicycle shift, notification apparatus 12. In particular, the cycling computer 24 is electrically connected to the signal controller 25 by a cable 48 to receive various data from other components of the electric bicycle shift system 16. The cable 48, can also optionally supply power to the cycling computer 24 as illustrated in FIG. 3. Alternatively, the cycling computer 24 can have its own power supply (e.g., a replaceable battery).

As illustrated in FIGS. 1 to 3, the cycling computer 24 is a part of the bicycle shift notification apparatus 12. However, the various functions of the cycling computer 24 can be integrated into one or both of the first and second shifters 20 and 21 and/or the signal controller 25. For example, the one or both of the first and second shifters 20 and 21 can be provided with a display for produce a visual indication as a notification for the bicycle shift notification apparatus 12. Thus, the bicycle shift notification apparatus 12 is no limited to being used with a cycling computer such as the cycling computer 24 as discussed herein.

The cycling computer 24 has a display 49 for displaying gear positions, speed, traveled distance and other information to the rider as in the case of most cycling computers. However, in the illustrated embodiment, the display 49 of the cycling computer 24 is also used to selectively produce a visual indication as a notification for the bicycle shift notification apparatus 12, as discussed below. Also in the illustrated embodiment, the cycling computer 24 further includes an input port 50, a sound emitting device 51 and a plurality of user inputs or control buttons B1, B2 and B3. Alternatively, one or more these components of the cycling computer 24 could be provided on other parts of the bicycle shift notification apparatus 12, as needed and/or desired. The input port 50 is a communication port such as a USB port for attaching a computer to update software and/or modify various operating parameters of the bicycle shift notification apparatus 12. The sound emitting device 51 of the cycling computer 24 is used to selectively produce a sound as a notification for the bicycle shift notification apparatus 12, as discussed below. The control buttons B1, B2 and B3 are used by the rider or other users to modify various operating parameters of the bicycle shift notification apparatus 12, as discussed below. While the control buttons B1, B2 and B3 are illustrated as mechanical buttons, the display 49 could be a touch screen with the control buttons being provided on the touch screen.

Referring to FIG. 3, in the illustrated embodiment, the signal controller 25 is operatively coupled to the various bicycle shift notification devices (e.g. the sound emitting device 41, the vibration device 42, the display 49, the sound emitting device 51) for selectively notifying a rider based on a determination of a current operating state of the bicycle transmission (e.g., the chain 26, the rear and front derailleurs 22 and 23, the rear sprockets 46 and the front chainwheels 47). While the signal controller 25 is electrical connected to the other parts of the electric bicycle shift system 16 as schematically illustrated in FIG. 3, it will be apparent from this disclosure that wireless communication may be used to operatively coupled the signal controller 25 other parts of the electric bicycle shift system 16 for receiving data. The signal controller 25 interprets and executes instructions (data, signals and commands) of the various programs and hardware to direct the operation of the electric bicycle shift system 16. The signal controller 25 includes a microcomputer 52 that includes a processor 53 and memory 54 for processing the various signals from the various sensors and components of the electric bicycle shift system 16. While the signal controller 25 is illustrated as a single separate unit, the signal controller 25 could be part of another component or could be a part of several components (e.g., multiple controllers located in different parts).

Referring mainly to FIGS. 4 and 5, examples of the notification provided by the bicycle shift notification apparatus 12 during riding of the bicycle 10 will now be discussed in more detail. As seen in FIG. 4, the bicycle shift notification apparatus 12 can provide several different notifications to the rider based on a determination of the current operating state. In the illustrated embodiment of FIG. 4, the gear shift mechanism (e.g., the rear and front derailleurs 22 and 23) of the bicycle has a plural speed stages (e.g. eighteen speed stages without the synchro-shift feature and thirteen speed stages with the synchro-shift feature). A high gear ratio refers to a higher bicycle speed per rotation of the crank arms, while a low gear ratio refers to a lower bicycle speed per rotation of the crank arms.

While the display 49 of the cycling computer 24 may constantly display the current speed stage (i.e., which of the rear sprockets 46 and the front chainwheels 47 are engaged with the chain 26), the various bicycle shift notification devices (e.g. the sound emitting device 41, the vibration device 42, the display 49, the sound emitting device 51) provide a separate and distinct notification to the rider for only some preselected speed stages but not all of the speed stages. In other words, when the current speed stage becomes one of the preselected speed stages, then one or more of the various bicycle shift notification devices (e.g. the sound emitting device 41, the vibration device 42, the display 49, and the sound emitting device 51) will provide a separate and distinct notification to the rider.

For example, in the illustrated embodiment of FIGS. 3 and 4, the signal controller 25 activates one or more of the various bicycle shift notification devices (e.g. the sound emitting device 41, the vibration device 42, the display 49, the sound emitting device 51) to produce the distinct notification in accordance with a preselected notification pattern based on determining that a predetermined condition exists and does not activate any of the bicycle shift notification devices to produce the distinct notification while determining that the predetermined condition does not exist. Here, in the illustrated embodiment of FIG. 4, three predetermined conditions (i.e., predetermined speed stage) that are used to trigger the distinct notification are as following: (1) one or more speed stages near a synchro-shift point; (2) a lowest speed stage of the speed stage or one or more preceding speed stages immediately adjacent to the lowest speed stage; and (3) a highest speed stage of the speed stage or one or more preceding speed stages immediately adjacent to the highest speed stage. The bicycle shift notification apparatus 12 can provide several different notifications to the rider based on a determination of the current operating state of the bicycle transmission to better inform the rider of the current operating state of the bicycle transmission.

In a synchro-shift operation illustrated in FIG. 4, a single gear shift operation occurs between the front chainwheels 47 and a double gear shift operation occurs in the rear sprockets 46. With such a synchro-shift operation, a large shifting shock can occur such that the gear shift does not shift smoothly if the rider is applying a large pealing force. Thus, it is beneficial to inform the rider of such a synchro-shift operation before it occurs. Also it is beneficial to inform the rider of when the bicycle transmission is near or at one of the endmost speed stage.

In the lower part of FIG. 4, several different notification patterns A to E of the bicycle shift notification apparatus 12 are illustrated. Preferably, as explained later, these different notification patterns can be selectively set by a rider or another user. Of course, the bicycle shift notification apparatus 12 is not limited to the illustrated patterns. Preferably, at least one of the bicycle shift notification devices (e.g. the sound emitting device 41, the vibration device 42, the display 49, and the sound emitting device 51) produces a sound, haptical and/or visual indication as the notification. However, for the sake of convenience, only a light indication of varying intensity will be used to illustrate the notifications.

In the pattern A of FIG. 4, the bicycle shift notification apparatus 12 only provides a total of six notifications: at three lower speed stages prior to the synchro-shift point and at three upper speed stages prior to the synchro-shift point. These six notifications occur while the bicycle transmission is in speed stages ①, ②, ③, ⑤, ⑥ and ⑦, where speed stage ① is the speed stage with the lowest gear ratio. Thus, the signal controller 25 activates at least one bicycle shift notification device at an adjacent speed stage immediately adjacent to the synchro-shift speed point as well as at two preceding speed stages immediately adjacent to the adjacent speed stage. These speed stages can be determined by the position sensors 22d and 23d or processing results. In other words, the notification triggers for pattern A are processing results of the signal controller 25 and/or position signals from the position sensors 22d and 23d. These notifications can be visually, haptically and/or auditorily given to the rider on the cycling computer 24 and/or one or both of the first and second shifters 20 and 21.

Preferably, the notifications for speed stages ①, ② and ③ are individually distinct from each other, and the notifications for speed stages ⑤, ⑥ and ⑦ are individually distinct from each other. For example, in the case of visual notifications such as a light, the intensity of the light notifications increases from as the speed stages approach the synchro-shift point. In other words, the intensity of the light notification for speed stage ③ is greater than the intensity of the light notification for speed stage ②, and the intensity of the light notification for speed stage ② is greater than the intensity of the light notification for speed stage ①. Similarly, the intensity of the light notification for speed stage ⑤ is greater than the intensity of the light notification for speed stage ⑥, and the intensity of the light notification for speed stage ⑥ is greater than the intensity of the light notification for speed stage ⑦. Alternatively, the light notifications could change color and/or patterns. Thus, in the pattern A, the bicycle shift notification device produces the notification differently for each of the preceding speed stages relative to the speed stages adjacent to the synchro-shift speed point.

In the case of an auditory or sound notification, the sound can change in sound volume, tone, pattern and/or composite. The sound notification can be output only one time, or can be output continuously when the current speed stage corresponds to one of the predetermined speed stages that require notification. In the case of a haptic notification, a portion of the bicycle (e.g., a handlebar grip) can be vibrated to notify the rider. When notifying the rider using vibration, the strength of the vibration can be changed by using an actuator, motor, solenoid, etc. to provide different notifications to the rider. Alternatively, the haptic notification can be provided to the rider by changing a feeling of the operation of one or both of the first and second shifters 20 and 21 (e.g., by changing the strength of an operating spring of the operation lever by using an actuator, motor, solenoid, etc.).

In the pattern B of FIG. 4, the bicycle shift notification apparatus 12 only provides only two notifications: at one lower speed stage prior to the synchro-shift point and at one upper speed stage prior to the synchro-shift point. In the pattern B of FIG. 4, the bicycle shift notification apparatus 12 only outputs the notifications when the signal controller 25 has already determined to perform synchro-shift operation, but shortly before (e.g., 0.5 sec.) the synchro-shift operation will actually be performed. In other words, a predetermined delay period occurs between the time of the notification and the time that the synchro-shift operation actually occurs. The notification triggers for pattern B are processing results of the signal controller 25 preparing to perform a synchro-shift operation. Again, these notifications can be visually, haptically and/or auditorily given to the rider on the cycling computer 24 and/or one or both of the first and second shifters 20 and 21. Thus, in the pattern B, the signal controller 25 activates at least one bicycle shift notification device after a start of a gear shifting operation to the synchro-shift speed point from an adjacent speed stage immediately adjacent to the synchro-shift speed point.

In the pattern C of FIG. 4, the bicycle shift notification apparatus 12 only provides a total of six notifications: at the lowest speed stage, two speed stages prior to the lowest speed stage, two speed stages prior to the highest speed stage and at highest speed stage. Thus, these six notifications occur while the bicycle transmission is in speed stages ①, ②, ③, ⑪, ⑫ and ⑬, where speed stage ① is the speed stage with the lowest gear ratio and the speed stage ⑬ is the speed stage with the highest gear ratio. These speed stages can be determined by the position sensors 22d and 23d or processing results. In other words, the notification triggers for pattern C are processing results of the signal controller and/or position signals from the position sensors 22d and 23d. These notifications can be visually, haptically and/or auditorily given to the rider on the cycling computer 24 and/or one or both of the first and second shifters 20 and 21. Preferably, the notifications for speed stages ①, ② and ③ are ⑬ individually distinct from each other, and the notifications for speed stages ⑪, ⑫ and ⑬ are individually distinct from each other as discussed above with respect to the pattern A, except that the notifications become more noticeably as they approach the endmost speed stages ① and ⑬. Thus, in this pattern C, the signal controller 25 activates at least one the bicycle shift notification device at the endmost speed stages that corresponds to the lowest and the highest speed stages of the speed stages as well as the two preceding speed stages immediately adjacent to the lowest and the highest speed stages.

In the pattern D of FIG. 4, the bicycle shift notification apparatus 12 only provides a total of four notifications: at one lower speed stage prior to the synchro-shift point, at one upper speed stage prior to the synchro-shift point, at the lowest speed stage of the speed stages and at the highest speed stage. Thus, these four notifications occur while the bicycle transmission is in speed stages ①, ③, ⑤ and ⑬. These speed stages can be determined by the position sensors 22d and 23d or processing results. These notifications can be visually, haptically and/or auditorily given to the rider on the cycling computer 24 and/or one or both of the first and second shifters 20 and 21, similar to the previously mentioned patterns. Preferably, the notifications for the endmost speed stage ① and ⑬ are individually distinct from the notifications at the speed stages ③ and ⑤ occurring prior to the synchro-shift point.

In the pattern E of FIG. 4, the bicycle shift notification apparatus 12 only provides a total of four notifications: at one lower speed stage prior to the synchro-shift point, at one upper speed stage prior to the synchro-shift point, at the lowest speed stage of the speed stages and at the highest speed stage. The pattern E is the same as the pattern D, discussed above, except that the notifications at one speed stages prior to the synchro-shift point only occur once the signal controller 25 has determined, to perform synchro-shift operation similar to the pattern B, discussed above.

Referring back to FIG. 3, preferably, various parameters for the bicycle shift notification apparatus 12 can be changed from a default setting by the user to provide a customized notification. The various features of the bicycle shift notification apparatus 12 can also be customize by attaching a personal computer to the bicycle shift notification apparatus 12 via a communication port (e.g., the port 50). In particular, the signal controller 25 further includes a predetermined condition selection component 55, a notification pattern selection component 56 and a notification output selection component 57. In the illustrated embodiment, the predetermined condition selection component 55, the notification pattern selection component 56 and the notification, output selection component 57 are provided by software stored in the memory 54 and executed by the processor 53. Basically, a user activates these components 55 to 57 by using the control buttons B1, B2 and B3 of the cycling computer 24, or by using a personal computer.

Figure 7:
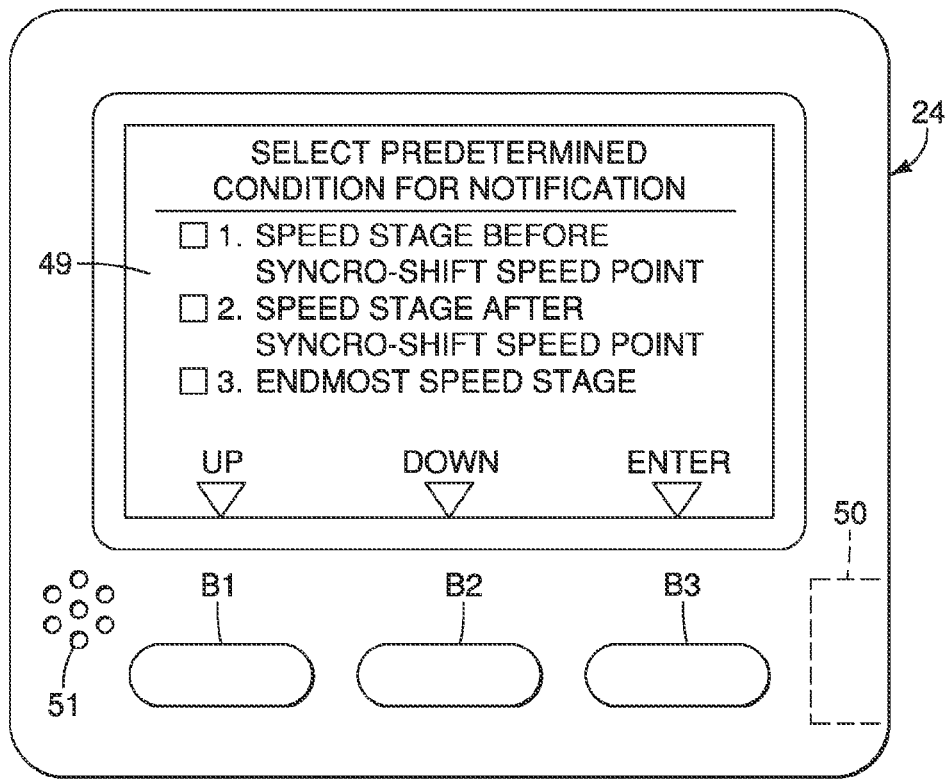
FIG. 7 is a top plan view of the cycling computer displaying a screen for a rider or other user to customize the predetermined condition for notification.
Figure 8:
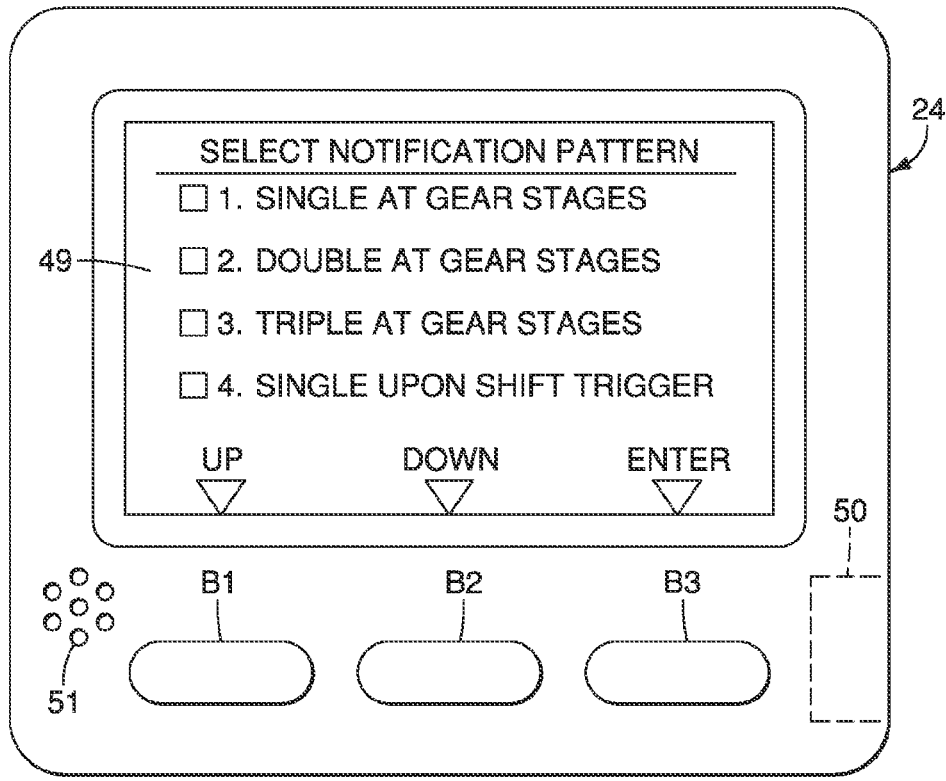
FIG. 8 is a top plan view of the cycling computer displaying a screen for a rider or other user to customize the predetermined condition for notification.
Figure 9:
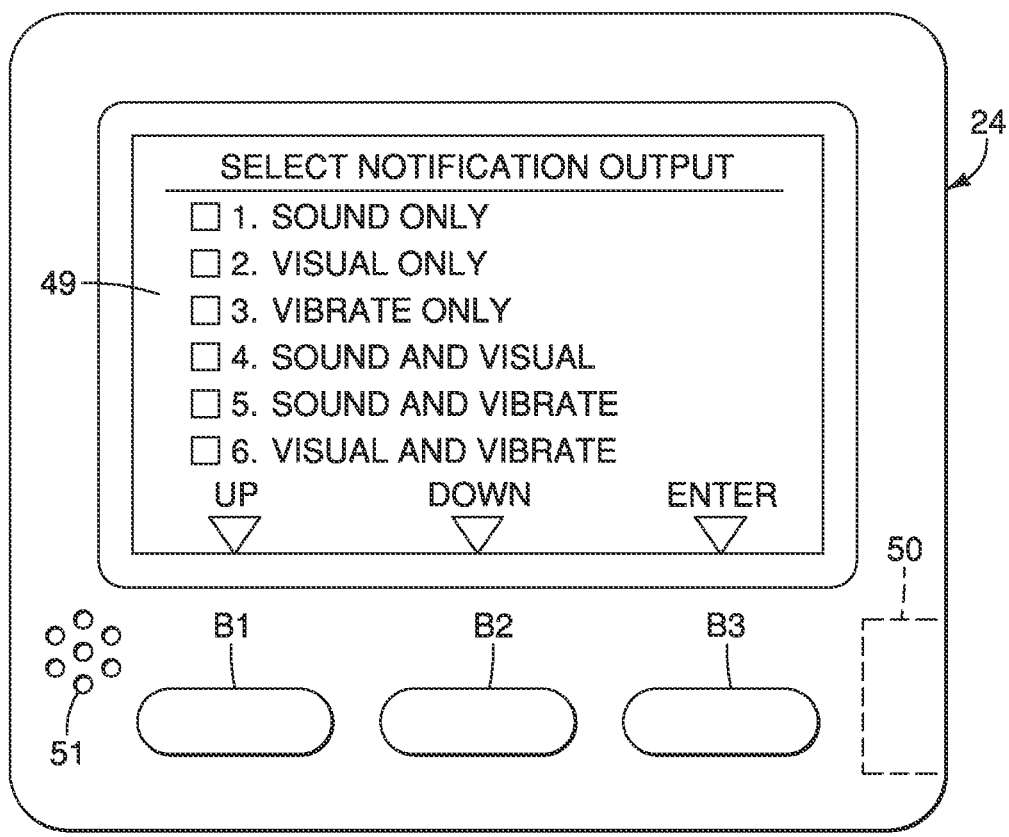
FIG. 9 is a top plan view of the cycling computer displaying a screen for a rider or other user to customize the notification output.

Preferably, as illustrated in FIGS. 7 to 9, these components 55 to 57 produce menu screens that guide the user step by step through the setup process of selecting the user settable operating parameters for the bicycle shift notification apparatus 12.

Preferably, the predetermined condition selection component 55 includes a plurality of user settable predetermined conditions, as illustrated in FIG. 7, for selection by the control buttons B1, B2 and B3 (e.g., the user input device) as the preselected predetermined condition. In the example illustrated in FIG. 7, a screen image is displayed by the cycling computer 24 to provide a rider or other user with options to customize the predetermined condition for notification. In this illustrated, the rider or user can select three options for the predetermined condition. Only three options are illustrated for the sake of brevity. Of course, the bicycle shift notification apparatus 12 can provide fewer or more options for the predetermined condition. Also the rider or user is not limited to selecting only one of the options as the predetermined condition. Rather the rider or user can select all of the options if desired. Here, the three illustrated options include: (1) Speed stage before synchro-shift speed point; (1) Speed stage after synchro-shift speed point; and (3) Endmost speed stage. Other options for the predetermined condition include, but not limited to, initiation of a synchro-shift operation.

Preferably, the notification pattern selection component 56 includes a plurality of user notification patterns, as illustrated in FIG. 8, for selection by the control buttons B1, B2 and B3 (e.g., the user input device) among the plurality of user settable notification patterns. In the example illustrated in FIG. 8, a screen image is displayed by the cycling computer 24 to provide a rider or other user with options to customize the notification pattern for notification. Some of the basic notification patterns are illustrated in FIG. 4. In particular, the notification patterns include, but not limited to, (1) a single notification at the gear stages selected as predetermined conditions (e.g., pattern D in FIG. 4); (2) a double notification at the gear stages selected as predetermined conditions (not shown in FIG. 4); and (3) a triple notification at the gear stages selected as predetermined conditions (e.g., patterns A and C in FIG. 4); and (4) a single notification at the gear stages selected as predetermined conditions (e.g., patterns B and E in FIG. 4). Preferably, additional screen images are displayed by the cycling computer 24 or personal computer to provide a user with other options to customize the notification pattern for notification. For example, an additional screen image can be displayed to allow the user to select continuous notification, intermittent notifications, or a one-time notification for a prescribed period of time. Clearly, the notification pattern selection component 57 can be configured to provide the user with a wide variety of options for customizing the pattern of the notification.

The notification output selection component 57 includes a plurality of user settable notification parameters (outputs) for selection, as illustrated in FIG. 9, for selection by the control buttons B1, B2 and B3 (e.g., the user input device) as the preselected outputs. Preferably, the notification output selection component 57 at least includes at least one of a sound setting parameter and a visual setting parameter among the plurality of user settable parameters for selection by the control buttons B1, B2 and B3 (e.g., the user input device). In the example illustrated in FIG. 9, a screen image is displayed by the cycling computer 24 to provide a rider or other user with options to customize the notification output. Some of the basic notification outputs are illustrated in FIG. 9. In particular, the notification outputs include, but not limited to, (1) sound only (2) visual only; (3) vibrate only; (4) sound and visual; (5) sound and vibrate; and (6) visual and vibrate. Preferably, additional screen images are displayed by the cycling computer 24 or personal computer to provide a user with other options to customize the notification output for notification. For example, a screen image can be provided so that the user can select a type of sound from a plurality of sounds, and a screen image can be provided so that the user can select a particular visual notification such as various images and/or various colors of lights.

Figure 12:
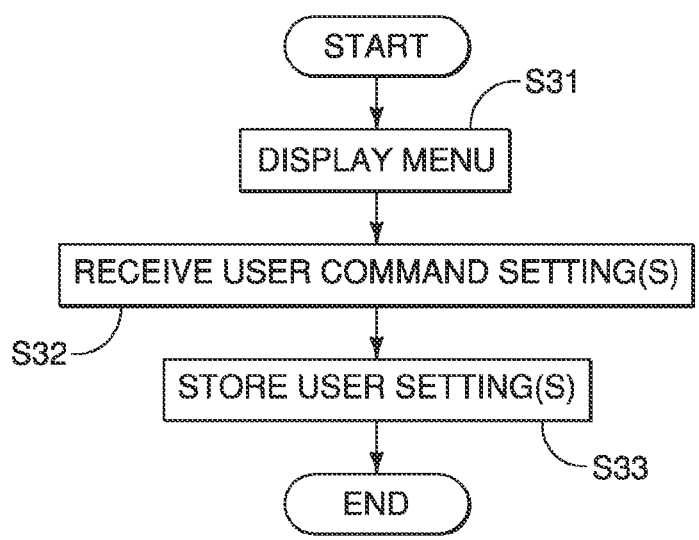
FIG. 12 is a flowchart showing the control processing executed by the controller of the bicycle shift notification apparatus, which constitutes at least one of a predetermined condition selection component, a notification selection component and notification pattern selection component.

Referring to FIG. 12, the control processing executed by the signal controller 25 of the bicycle shift notification apparatus 12 for inputting user selectable parameters will now be discussed. Basically, in step S31, the user will bring up a customization menu (not shown) on the display 49 of the cycling computer 24 to provide the user with options to customize the bicycle shift notification apparatus 12. Then using a series of displays, such as the ones shown in FIGS. 7 to 9, the user selects the desired setting, which results in the selected parameters being received by the bicycle shift notification apparatus 12 as indicated in step S32. Each time the user set a new parameter, the signal controller 25 stores the user setting in the memory 54 as indicated in step S33.

Figure 10:
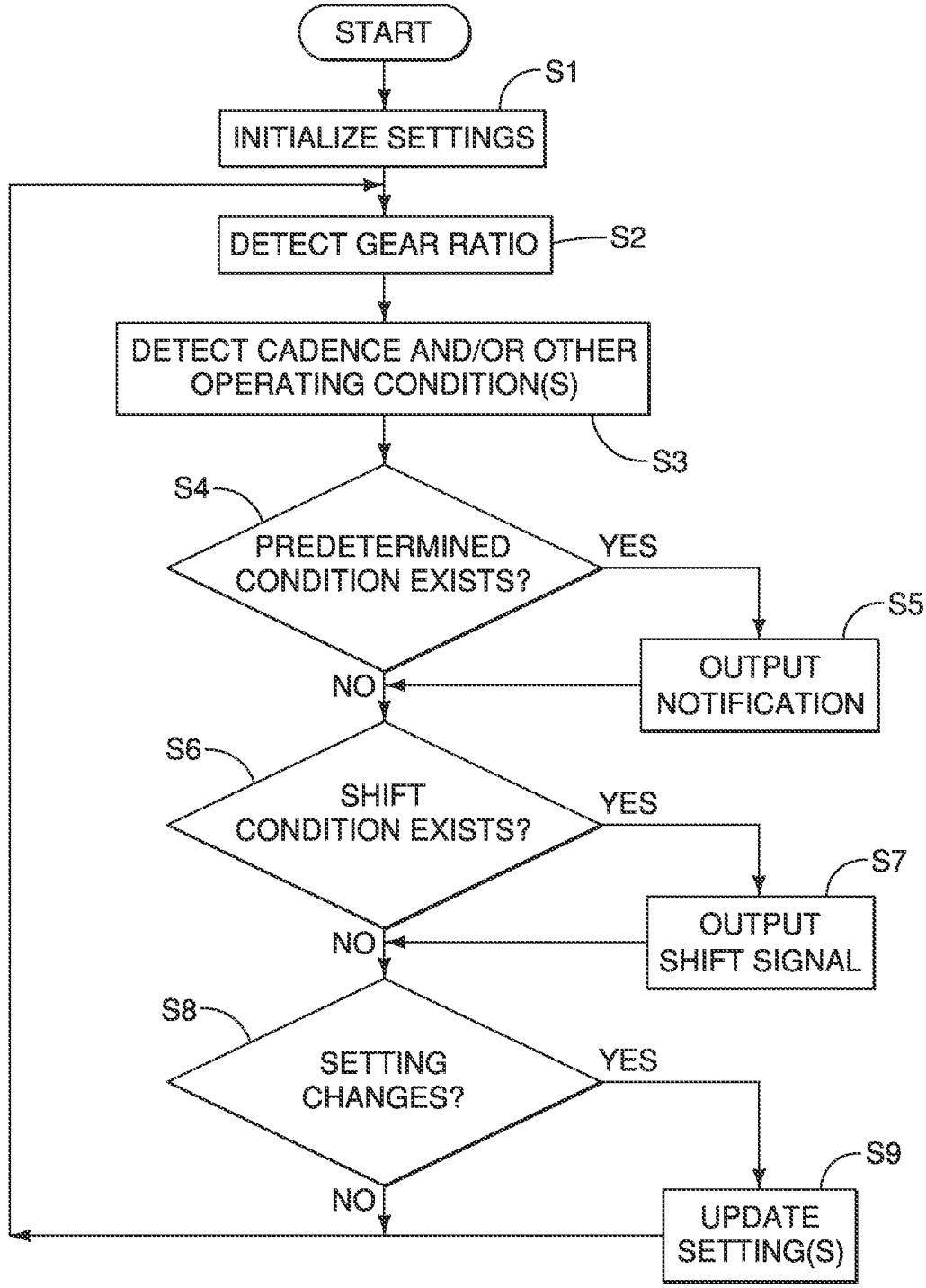
FIG. 10 is a flowchart showing the control processing executed by the controller of the bicycle shift notification apparatus for the automatic shifting mode.

Referring now to FIG. 10, the control processing executed by the signal controller 25 of the bicycle shift notification apparatus 12 for producing a notification while the automatic shifting mode will now be discussed. As mentioned above, the signal controller 25 does not activate any of the bicycle shift notification devices for outputting the notification while determining that the predetermined condition does not exist.

In step S1, all of the parameters set by the user are uploaded, detected values and/or flags are cleared from memory. Then the process proceeds to step S2.

In step S2, the signal controller 25 receives signals from the position sensors 22d and 23d or other gear positioning detecting devices to determine the current gear ratio of the bicycle transmission based on the current positions of the rear and front derailleurs 22 and 23. Then the process proceeds to step S3.

In step S3, the signal controller 25 determines the operating or running condition(s) of the bicycle 10. In the illustrated embodiment, the signal controller 25 determines the operating or running condition(s) of the bicycle 10 using the crank rotational speed sensor 28 and/or the wheel rotational speed sensor 29 as well as other sensors as needed and/or desired. Typically, the most relevant parameter in determining when to shift is the rider's cadence, which is determined by the crank rotational speed sensor 28 in the illustrated embodiment. Of course, the bicycle shift notification apparatus 12 can be used with any automatic shifting control program. Also since automatic shifting control programs are well known and different control programs use different parameters for shifting, the further details of the automatic shifting control program will be omitted for the sake of brevity.

In step S4, the signal controller 25 determines if the predetermined condition exists. As mentioned above, the predetermined condition can be either a default setting or can be selectively set by the rider or user. In the example illustrated in FIG. 7, the rider or user can select three options for the predetermined condition. Preferably, as mentioned above, the predetermined condition includes at least one of a speed stage before a speed stage of the synchro-shift speed point, a speed stage after a speed stage of the synchro-shift speed point, and an endmost speed stage.

In step S4, if the signal controller 25 determines that the predetermined condition exists, then process proceeds to step S5, where the notification is outputted by the selected notification device(s). On the other hand, in step S4, if the signal controller 25 determines that the predetermined condition does not exists, then the process proceeds to step S6.

In step S6, the signal controller 25 determines if the operating or running conditions of the bicycle 10 constitute a shift condition or not. If a shift condition exists, the process proceeds to step S7. If a shift condition does not exist, then the process proceeds to step S8.

In step S7, the signal controller 25 outputs a shift signal to one or both of the rear and front derailleurs 22 and 23 to activate the motor 22e and/or the motor 23e to perform the appropriate shift. Then the process proceeds to step S8.

In step S8, the signal controller 25 determines if any settings have been changed by the user, due to a shifting operation, due to a detection signal from a sensor, etc. If settings have changed, then the process proceeds to step S9 where the settings are updated and stored in memory. If the settings remain unchanged, then the process returns to step S2.

Figure 11:
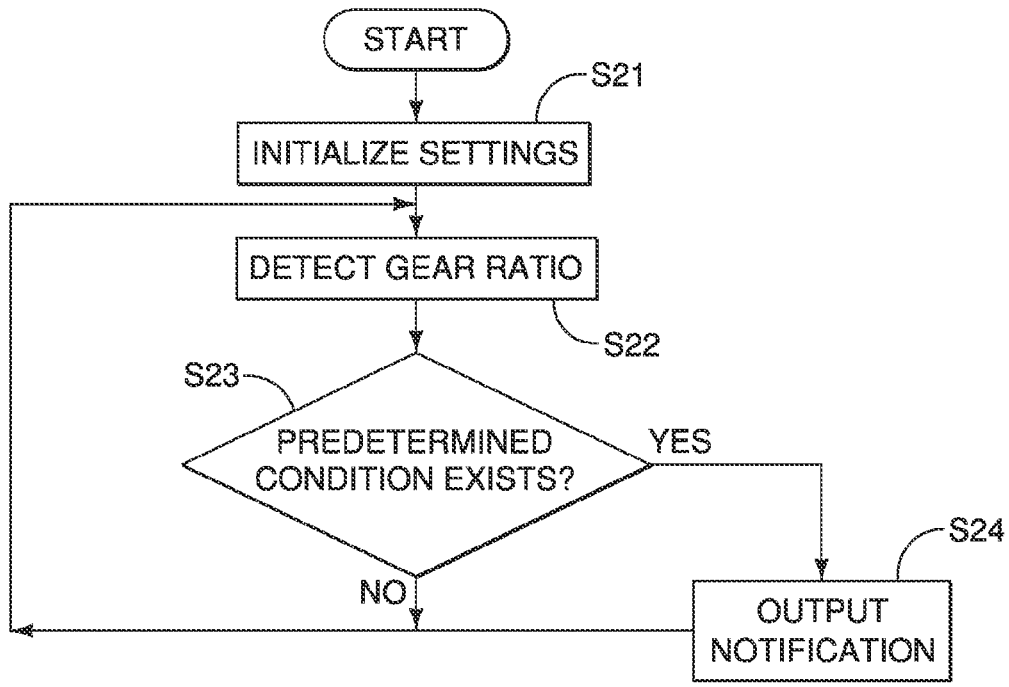
FIG. 11 is a flowchart showing the control processing executed by the controller of the bicycle shift notification apparatus for the manual shifting mode.

Referring now to FIG. 11, the control processing executed by the signal controller 25 of the bicycle shift notification apparatus 12 for producing a notification while in the manual shifting mode will now be discussed. In step S21, all of the parameters set by the user are uploaded, detected values and/or flags are cleared from memory. Then the process proceeds to step S22.

In step S22, the signal controller 25 receives signals from the position sensors 22d and 23d or other gear positioning detecting devices to determine the current gear ratio of the bicycle transmission based on the current positions of the rear and front derailleurs 22 and 23. Then the process proceeds to step S23.

In step S23, the signal controller 25 determines if the predetermined condition exists. As mentioned above, the predetermined condition can be either a default setting or can be selectively set by the rider or user. If the signal controller 25 determines that the predetermined condition exists, then process proceeds to step S24, where the notification is outputted by the selected notification device(s). On the other hand, in step S23, if the signal controller 25 determines that the predetermined condition does not exists, then the process returns to step S22.

Referring now to FIG. 12, the control processing executed by the signal controller 25 of the bicycle shift notification apparatus 12 for inputting user selectable parameters will now be discussed. Basically, the user will bring up a customization menu (not shown) on the display 49 of the cycling computer 24 to provide the user with options to customize the bicycle shift notification apparatus 12. Then using a series of displays, the user inputs the various parameters for the bicycle shift notification apparatus 12 in step S31. Each time the user set a new parameter, the signal controller 25 stores the user setting in the memory 54 as indicated in step S32.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, the term "upshift" refers to a change in a gear ratio of a transmission that results in the bicycle wheels rotating faster per rotation of the crank arms. As used herein, the term "downshift" refers to a change in a gear ratio of a transmission that results in the bicycle wheels rotating slower per rotation of the crank arms.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shift notification apparatus comprising:
   a transmission state determining component that determines a current operating state of a bicycle transmission having a plurality of speed stages;
   a bicycle shift notification device that produces a notification based on a determination of the current operating state by the transmission state determining component; and
   a controller operatively coupled to the bicycle shift notification device, the controller activating the bicycle shift notification device to produce the notification in accordance with a preselected notification pattern based on determining that a predetermined condition exists, and not activating the bicycle shift notification device to produce the notification while determining that the predetermined condition does not exist.

2. The shift notification apparatus according to claim 1, wherein
   the controller determines the predetermined condition as including at least one of a speed stage before a speed stage of the synchro-shift speed point, a speed stage after a speed stage of the synchro-shift speed point, and an endmost speed stage.

3. The shift notification apparatus according to claim 1, wherein
   the bicycle shift notification device produces a sound as the notification.

4. The shift notification apparatus according to claim 1, wherein
   the bicycle shift notification device produces a visual indication as the notification.

5. The shift notification apparatus according to claim 1, wherein
   the controller activates the bicycle shift notification device after a start of a gear shifting operation to the synchro-shift speed point from an adjacent speed stage immediately adjacent to the synchro-shift speed point.

6. The shift notification apparatus according to claim 1, wherein
the controller activates the bicycle shift notification device at an adjacent speed stage immediately adjacent to the synchro-shift speed point.

7. The shift notification apparatus according to claim 6, wherein
the controller further activates the bicycle shift notification device at a preceding speed stage immediately adjacent to the adjacent speed stage.

8. The shift notification apparatus according to claim 7, wherein
the bicycle shift notification device produces the notification differently for each of the preceding speed stage and the adjacent speed stage.

9. The shift notification apparatus according to claim 1, wherein
the controller activates the bicycle shift notification device at the endmost speed stage that corresponds to a lowest speed stage of the speed stages.

10. The shift notification apparatus according to claim 9, wherein
the controller further activates the bicycle shift notification device at a preceding speed stage immediately adjacent to the lowest speed stage.

11. The shift notification apparatus according to claim 1, wherein
the controller activates the bicycle shift notification device at the endmost speed stage that corresponds to a highest speed stage of the speed stages.

12. The shift notification apparatus according to claim 11, wherein
the controller further activates the bicycle shift notification device at a preceding speed stage immediately adjacent to the highest speed stage.

13. The shift notification apparatus according to claim 1, wherein
the controller activates the bicycle shift notification device at an adjacent speed stage immediately adjacent to each side of the synchro-shift speed point; and
the controller further activates the bicycle shift notification device at the endmost speed stage that corresponds to a highest speed stage of the speed stages and an endmost speed stage that corresponds to a lowest speed stage of the speed stages.

14. The shift notification apparatus according to claim 1, further comprising
a user input device operatively coupled to the controller, the controller including a predetermined condition selection component to select the predetermined condition among a plurality of user settable predetermined conditions.

15. The shift notification apparatus according to claim 14, wherein
the predetermined condition selection component includes at least one of before a speed stage of the synchro-shift speed point, after a speed stage of the synchro-shift speed point and an endmost speed stage among the plurality of user settable predetermined conditions for selection by the user input device.

16. The shift notification apparatus according to claim 1, further comprising
a user input device operatively coupled to the controller, the controller including a notification output selection component that includes a plurality of user settable parameters for selection by the user input device.

17. The shift notification apparatus according to claim 16, wherein
the notification output selection component includes at least one of a sound setting parameter and a visual setting parameter among the plurality of user settable parameters for selection by the user input device.

18. The shift notification apparatus according to claim 1, further comprising
a user input device operatively coupled to the controller, the controller including a notification pattern selection component that includes a plurality of user settable notification patterns for selection by user input device as the preselected notification pattern.

* * * * *